(12) United States Patent
Schmidt

(10) Patent No.: US 6,202,975 B1
(45) Date of Patent: Mar. 20, 2001

(54) APPARATUS FOR USE IN MOUNTING A TUBULAR STRUCTURE ON A VEHICLE FENDER

(76) Inventor: William P. Schmidt, 21000 Woodruff, Rockwood, MI (US) 48173

( * ) Notice: Subject to any disclaimer, the term of this patent is extended or adjusted under 35 U.S.C. 154(b) by 0 days.

(21) Appl. No.: 08/786,762

(22) Filed: Jan. 24, 1997

(51) Int. Cl.⁷ .................................................. G02B 7/182
(52) U.S. Cl. ...................... 248/475.1; 359/871; 411/182
(58) Field of Search .................. 248/475.1, 479, 248/200; 359/871, 872; 411/182, 84; 296/152

(56) References Cited

U.S. PATENT DOCUMENTS

| | | | |
|---|---|---|---|
| 1,835,710 | * 12/1931 | Jenkins et al. | 411/84 |
| 3,136,350 | * 6/1964 | Rapata | 411/182 |
| 3,495,799 | * 2/1970 | Murgas | 248/475.1 |
| 3,508,593 | * 4/1970 | Gill | 411/182 |
| 4,368,868 | * 1/1983 | Urban | 248/475.1 X |
| 4,441,681 | * 4/1984 | Oda et al. | 248/475.1 |
| 4,529,161 | * 7/1985 | Lockwood, Sr. | 248/475.1 X |
| 5,046,904 | * 9/1991 | Malinow | 411/182 X |
| 5,069,410 | * 12/1991 | McKee | 248/475.1 |
| 5,576,899 | * 11/1996 | Englander | 248/475.1 X |

* cited by examiner

Primary Examiner—Derek J. Berger

(57) ABSTRACT

An apparatus for use in mounting a tubular structure on a vehicle fender includes a base member with at least one groove formed therein for receiving a tubular structure. A retaining member is preferably provided for clamping to the base member to releasably lock a tubular structure therebetween. Attachment members may be pressed into holes formed in a vehicle fender for receiving threaded fasteners therein to hold the apparatus in place and assembled.

3 Claims, 2 Drawing Sheets

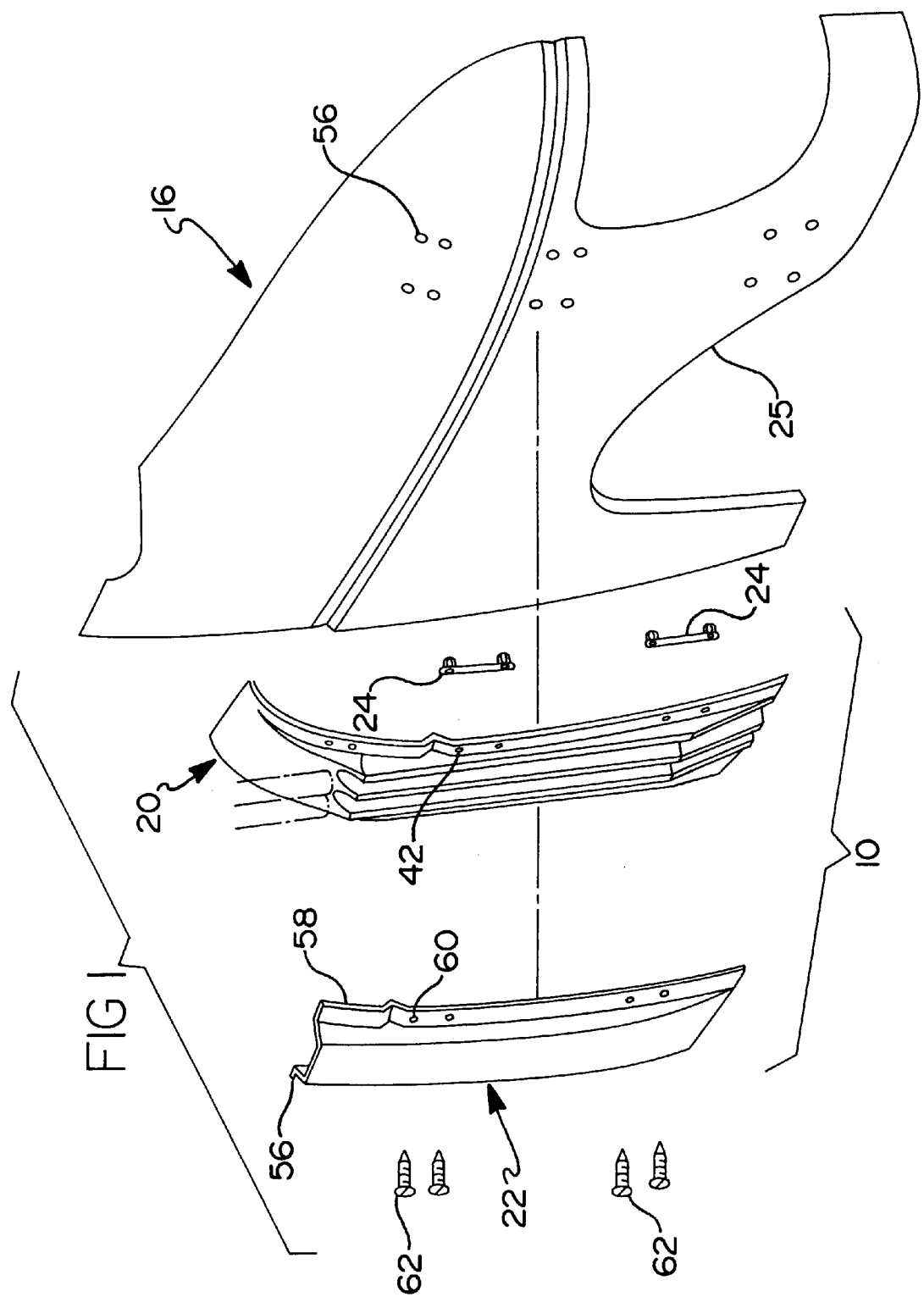

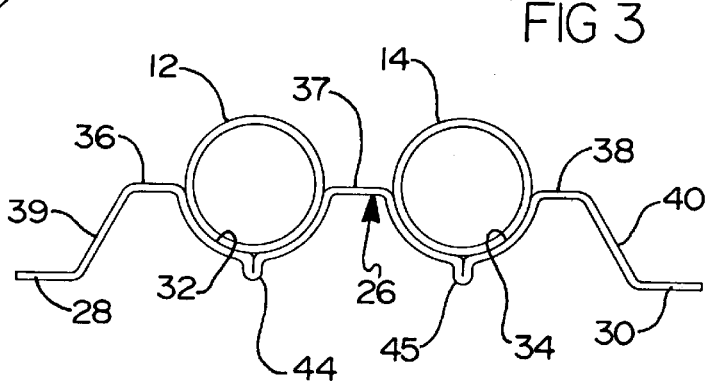
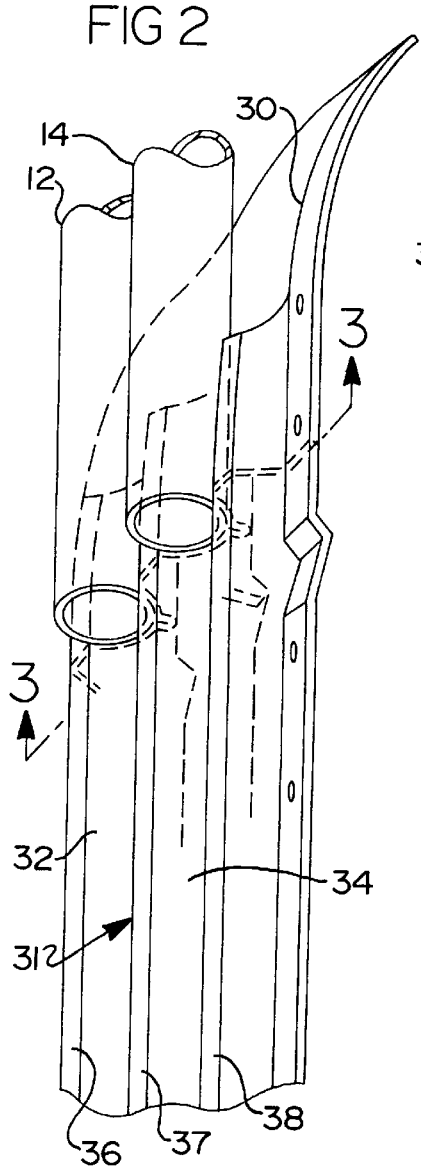
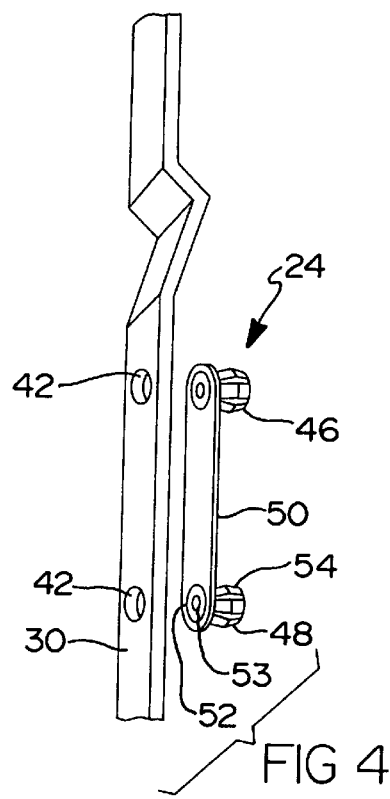

APPARATUS FOR USE IN MOUNTING A TUBULAR STRUCTURE ON A VEHICLE FENDER

BACKGROUND OF THE INVENTION

1. Field of the Invention

The present invention relates to mounting hardware for use on a vehicle. More particularly, the present invention relates to an apparatus for use in mounting a tubular structure, such as a mirror support arm, on a vehicle fender.

2. Description of the Background Art

Many types of external vehicle mirrors are known and used today. On larger vehicles, such as trucks and buses, large side view mirrors are commonly used, and these mirrors are often held up and supported by one or more tubular support arms. Oftentimes, this support arm is bolted directly on to a vehicle fender. One common type of tubular mirror support arm assembly is in the shape of a tripod mounted sideways on the vehicle, with the mirror being mounted at the point where the three sections of the tripod come together. One disadvantage of the tripod type of design is that the mirror support arms only connect to the vehicle fender at three points, and if any of these come loose, the mirror is likely to become misaligned. A second disadvantage of this tripod design is that the support sections come away from the vehicle fender at an angle which makes them susceptible to damage from tree branches or other obstacles. Yet another disadvantage of the tripod design is that the mirror may be adjusted only at a single pivot point.

Therefore, there is a need in the art for an improved apparatus for use in mounting a tubular structure, such as a mirror support arm, to a vehicle fender.

Accordingly, it is an object of the present invention to provide a mounting apparatus for a tubular structure which is usable to give improved support along many points of the tubular structure.

It is another object of the present invention to provide a mounting apparatus for a tubular structure which is usable with a mirror support arm to give higher clearance along a fender than is available with the tripod design.

Other objects, features, and advantages of the present invention will become apparent in the following detailed description.

SUMMARY OF THE INVENTION

The present invention provides an apparatus for use in mounting a tubular structure, such as a mirror support arm, on a vehicle fender. An apparatus in accordance with the present invention, generally, includes a base member for attaching to a vehicle fender, the base member including:

a support body for receiving and supporting a tubular structure, the support body having a front, a back, a first side and a second side opposite the first side, the support body further having a first groove formed therein of a shape corresponding to a shape of a tubular structure to be supported; and a pair of side reinforcing strips for contacting the vehicle fender, including a first side reinforcing strip being located on the first side of the support body and attached thereto, and a second side reinforcing strip being located on the second side of the support body and attached thereto.

The support body may include an inner support boss extending along the back side thereof, opposite the first groove, for contacting the vehicle fender. The support body may further have a second groove formed therein which is substantially parallel to the first groove.

The apparatus of the present invention may further include one or more attachment members for connecting the base member to a vehicle fender, each of the attachment members including:

a pair of resiliently deformable anchors for placing in holes in the vehicle fender and for engagingly receiving threaded fasteners therein, each anchor including a substantially cylindrical collar and a plurality of substantially bow-shaped legs attached to and extending outwardly from the collar, all the legs together resembling a barrel shape; and a substantially flattened bridge section attached to and interconnecting the anchor collars.

An apparatus according to the present invention preferably also includes a retaining member for placing over and clamping to the base member to releasably lock a tubular structure therebetween.

For a more complete understanding of the present invention, the reader is referred to the following detailed description section, which should be read in conjunction with the accompanying drawings. Throughout the following description and in the drawings, like numbers refer to like parts.

BRIEF DESCRIPTION OF THE DRAWINGS

FIG. 1 is an exploded perspective view of an apparatus in accordance with the present invention, shown on a vehicle fender;

FIG. 2 is a perspective view of a base member of the embodiment of FIG. 1, also showing a pair of tubular structures supported thereby;

FIG. 3 is a cross-sectional view taken along the line 3—3 of FIG. 2; and

FIG. 4 is a detail perspective view of an attachment member according to the present invention.

DETAILED DESCRIPTION OF THE PREFERRED EMBODIMENT

Referring now to the drawings, a mounting apparatus in accordance with the present invention is shown generally at 10. The apparatus 10 is provided for use in mounting a tubular structure such as a mirror support arm 12, 14, on a vehicle fender 16. The apparatus 10 hereof may be used to mount other alternative tubular structures such as, e.g., a support arm for an auxiliary light assembly (not shown). The apparatus 10 includes a base member 20 and an optional cover member 22, and preferably includes a plurality of attachment members 24.

All discussion herein of relative terms of orientation such as 'upper', 'lower', 'inner', 'outer', 'front', 'back', and the like is made with reference to the orientation of the components as shown in the drawings, and to the orientation of the components with respect to a vehicle fender.

The base member 20 is formed from a strong, rigid material such as metal or a durable plastic. As shown in FIGS. 1–3, the base member 20 is formed generally in the shape of a modified vertically oriented bar for affixing to, and conforming to the shape of a vehicle fender 16, forwardly of a wheel well 25 thereof. The base member 20 includes a central support body 26 and a pair of generally flattened side reinforcing strips 28, 30 on either side of the support body. The support body 26 has a front 31 having first and second grooves 32, 34 formed therein for receiving and supporting a pair of tubular structures, such as first and second mirror support arms 12, 14, therein. The grooves 32, 34 in the base member are formed in the general shape of the tubular structures intended to be supported thereby, and in the depicted embodiment, the grooves are substantially vertical. The primary type of tubular structures intended to be held and supported by the apparatus 10 hereof are mirror support arms. The front 31 of the support body 26 has three outwardly projecting ribs, 36, 37, 38 thereon, with the grooves 32, 34, falling between and partially defined by the ribs 36, 37, 38. The support body 26 further includes left and right sides 39, 40 which slope back from the outermost two of the ribs 36, 38 to join with the side reinforcing strips 28, 30. The side reinforcing strips 28, 30 are integrally formed with the support body 26 and are provided for reinforcement and for use in attaching the base member 20 to a vehicle fender 16. The side reinforcing strips 28, 30 have holes 42 formed therein to accommodate appropriate fasteners for fastening the apparatus 10 to the fender 16 as will be further discussed herein. The base member 20 may be formed out of a relatively thin sheet of material, as shown in the cross-sectional view of FIG. 3. Where the sheet design is used, the support body 26 may include a pair of support bosses 44, 45 extending inwardly therealong opposite the first and second grooves 32, 34 for contacting the vehicle fender 16.

An equivalent base member to that shown in the drawings could be made from a solid piece of cast plastic with an identical outer configuration to that shown and described herein, but with a substantially flattened inner surface for mounting flush with the vehicle fender 16.

Preferably, a plurality of attachment members 24 are also provided for anchoring the base member 20 to the vehicle fender 16. Although only two attachment members 24 are shown in FIG. 1, this is for purposes of illustration only, since all of the attachment members 24 are substantially identical to one another. A total of six attachment members 24 would be used with the embodiment shown in the drawings. As best shown in FIG. 4, each of the attachment members 24 includes a pair of resiliently deformable anchors 46, 48, for receiving threaded fasteners therein, the anchors 46, 48 being interconnected by a substantially flattened bridge section 50. Each anchor 46, 48 includes a substantially cylindrical collar 52 having a hole 53 formed therethrough for receiving and holding the threaded end (not shown) of a conventional threaded fastener therein. Each anchor 46, 48 further includes a plurality of substantially bow-shaped legs 54 attached to and extending away from the collar 52, all of the legs together resembling a barrel shape. As noted, a substantially flattened bridge section 50 is provided attached to and interconnecting the anchor collars 52.

The cover member 22 provides a preferred type of retaining member for clamping to the base member 20 to releasably lock a tubular structure, such as the mirror support arms 12, 14, therebetween. The cover member 22 is configured to fit over the base member 20 and includes flattened edges 56, 58 with holes 60 formed therethrough which are alignable with the holes 42 in the base member 20.

In use, the base member 20 is configured to fit on a particular fender 16. A plurality of holes 56 are bored in the fender 16, spaced apart to accept the attachment members 24 and to line up with the side reinforcing strips 28, 30 of the base member 20. The anchors 46, 48 of each attachment member are pressed into appropriate adjacent holes 56, temporarily deforming the legs 54 thereof, which spring back to their original configuration to retain the attachment member in place on the fender 16. After the total required number of attachment members 24 are in place on the fender 16, the base member 20 is placed where it is to be mounted. The mirror support arms 12, 14 are then placed and held in the preferred orientation thereof in the grooves 32, 34 of the base member 20. The cover member 22 is then placed over the base member 20, trapping the support arms 12, 14 therebetween. Then, conventional threaded fasteners such as screws 62 or bolts are placed through the holes 60 in the cover member 22, through the holes 42 in the base member, and into the holes 53 in the collars 52 of the anchor members to hold the apparatus 10 together. The fasteners are then tightened to clamp the cover member 22 to the base member 20 to releasably lock the support arms 12, 14 therebetween.

Although the present invention has been described herein with reference to a preferred embodiment thereof, the description is intended to be illustrative, and not restrictive. The scope of the invention is not limited to the embodiment described, but is described by the claims.

Having, thus, described the invention, what is claimed is:

1. An apparatus for use in mounting a tubular support arm for a vehicular accessory on a vehicle fender, the apparatus comprising:

(a) a base member having a contour to mate with a vehicle fender and being matingly attachable to a vehicle fender, the base member comprising:

(i) a support body for receiving and supporting a tubular support arm for a vehicular accessory, the support body having a front and a back and further having a first side and a second side opposite the first side, the support body further having a first groove formed in the front thereof of a shape adapted to correspond to a shape of the tubular support arm for a vehicular accessory to be supported; and (ii) a pair of side reinforcing strips for contacting the vehicle fender, including a first side reinforcing strip being located on the first side of the support body and attached thereto, and a second side reinforcing strip being located on the second side of the support body and attached thereto; and (b) an attachment member for connecting the base member to a vehicle fender, the attachment member comprising:

(i) a pair of resiliently deformable anchors for placing in holes in the vehicle fender and engagingly receiving threaded fasteners therein, each anchor comprising a substantially cylindrical collar and a plurality of substantially bow-shaped legs attached to and extending away from the collar, all the legs resembling a barrel shape; and (ii) a substantially flattened bridge section attached to and interconnecting the anchor collars.

2. The apparatus of claim 1, wherein the support body further comprises an inner support boss extending along the back thereof opposite the first groove for contacting the vehicle fender.

3. The apparatus of claim 1, wherein the support body has a second groove formed therein which is substantially parallel to the first groove.

* * * * *